Sept. 8, 1964  J. BENOIT  3,147,984
TORIC PACKINGS
Filed May 9, 1961

INVENTOR
JEAN BENOIT
BY Craig and Freudenberg
ATTORNEYS

United States Patent Office 3,147,984
Patented Sept. 8, 1964

3,147,984
TORIC PACKINGS
Jean Benoit, Villennes-sur-Seine, France, assignor to Le Joint Francais, Paris, France, a French corporation
Filed May 9, 1961, Ser. No. 108,780
Claims priority, application France June 7, 1960
8 Claims. (Cl. 277—237)

This invention relates to packings adapted to ensure fluid-tightness between two parts having a relative angular movement taking place between them, for example a shaft and its casing; it has as its object more particularly to maintain fluid-tightness to liquids under pressure.

Hitherto, the solution commonly used to this end have led to the use of packings having a more or less complicated cross-section and in one or more parts, frequently with the use of a gasket spring exerting pressure on a part of the packing forming one or more lips of contact with the shaft.

It has however been proposed to use the packing in one piece of the simplest form, that is to say a toric packing, and it has been ascertained that such a packing must be mounted on the shaft in a deformed or compressed state, if it is to be fluid-tight. In spite of this precaution, the life of toric packings remains short owing to relatively rapid wear of the fibres due to over-heating of the packing.

The present invention now makes it possible to utilise toric packings, normally mounted around the shafts within machining margins, and having a long life.

It relates to a toric packing and more especially to a packing which is tight to liquids under pressure, characterised by the feature that it comprises nipples on either side of the plane of the packing, preferably arranged perpendicularly to the latter.

It also has its object to mount such a packing in a groove formed between two parts, having a relative angular movement between them, the form of mounting being characterised by the feature that the nipples have a height and distribution such, with respect to the distance between the lateral walls of the groove, that the packing follows an undulating course on either side of the normal plane of the packing when idle.

Through this method of mounting, during rotation of the shaft or other rotary part, the film of lubricant is continually swept through the undulating parts of the packing, which is thus energetically lubricated, it is not subjected to over-heating and ensures fluid-tightness for a very long time.

Other features of the invention will be described hereunder with reference to the drawing illustrating a toric packing having four cylindrical nipples at the same height distributed at 90° along the circumference of the packing, alternately on either side of the mean plane of the latter.

Figure 1:
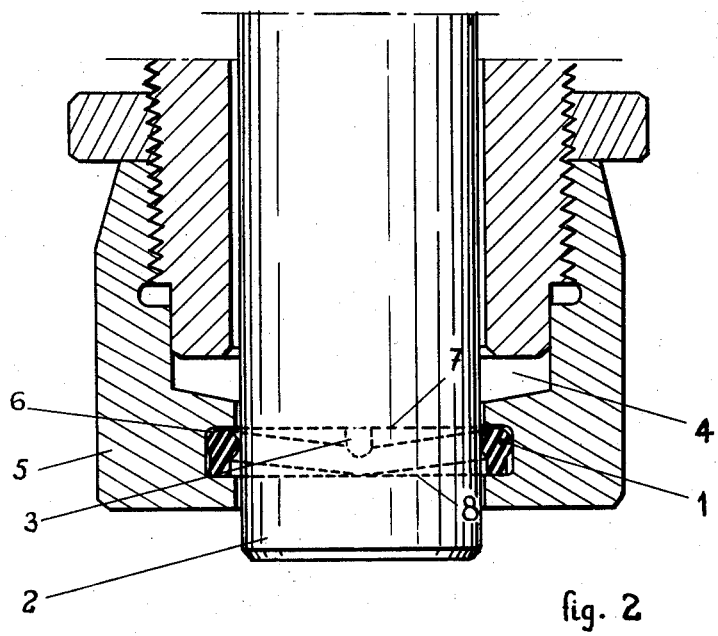
FIGURE 1 is a view in axial cross-section of the sealing casing surrounding a shaft, with a groove machined in the casing to receive the toric packing according to the invention.

In FIGURE 1, reference numeral 1 designates a toric packing including an annular body portion surrounding a shaft 2 and provided with a plurality of circumferentially spaced nipples 3. Toric packing 1 is made of rubber, elastomer or other plastic material resistant to lubricants. Nipples 3 are spaced circumferentially around the circumference of packing 1 with adjacent nipples projecting on opposite sides of the plane of packing 1.

A fluid-tight casing 5 surrounds the shaft 2 and is provided with a groove 6 for accommodating packing 1.

According to FIGURE 1, the distance between the side walls 7 and 8 of the groove is equal, within machining tolerances, to the thickness of the packing plus the height of one nipple.

Naturally this is only one embodiment; the even number of nipples may, with a similar equidistant distribution, be greater or less than four, the height of the nipples being the same or different.

Figure 2:
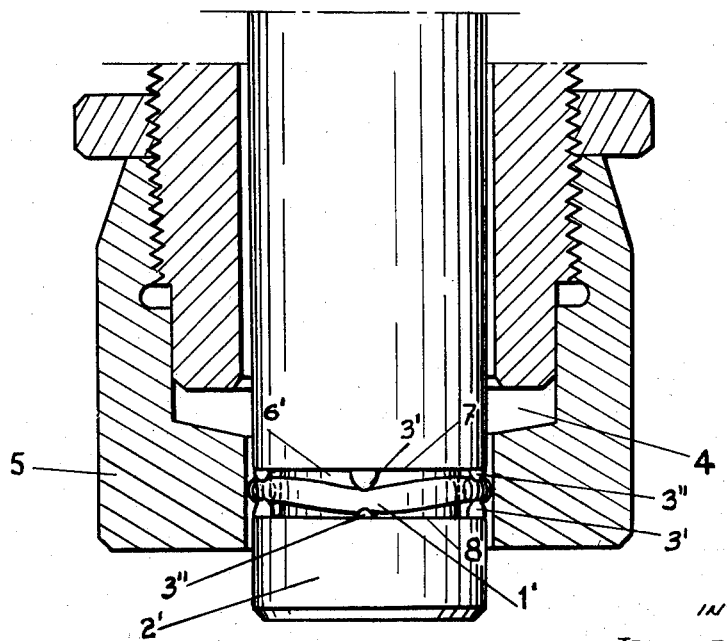
FIGURE 2 is a view in axial cross section of another embodiment of the present invention with a groove machined in a shaft, and with a modified packing provided therein.

In the embodiment of FIGURE 2 a groove 6' is provided in shaft 2' and receives a modified packing 1'. A fluid-tight casing 5' surrounds shaft 2'. Toric packing 1' is provided with a plurality of pairs of opposed nipples projecting on opposite sides of the plane of packing 1'. Each pair of nipples includes a nipple 3' which is taller than the other nipple 3''. The taller nipple 3' of each pair of aligned nipples projects on the opposite side of the plane of packing 1' than do the taller nipples 3' of the adjusting pairs of nipples so that packing 1' is given an undulating contour positioned within groove 6'. Normally with such a packing, the depth of the groove 6' between wall portion 7' and 8' of casing 5' will be substantially equal to the thickness of the toric packing 1' plus the sum of the heights of two nipples 3' and 3'' of different height.

It will, of course, be appreciated that the packing 1' of FIGURE 2 is equally useful in the groove 6 of the FIGURE 1 embodiment, and conversely that the packing 1 of the FIGURE 1 embodiment may be used within the groove 6' provided in the shaft 2' of FIGURE 2.

The radial section of the body portion of the packing of either embodiment is generally a circle, but it may also be an ellipse, an oval or the like. The nipples will preferably be small cylinders with a plane end face, which comes to bear on the lateral part of the groove. It is however quite within the scope of the invention to give a different form to these nipples and their end face may be arched. Instead of being directed perpendicularly to the plane of the packing when idle, they might be arranged obliquely to the said plane. The essential point is, as shown in the drawings, to give the contour of the packing an undulating or zig-zag course, which produces energetic sweeping of the lubricant.

This effect of sweeping the oil may be still further increased by modifying the radial section and by adding scraping lips to the packing.

Any packing according to the invention may be made without difficulty by moulding in one piece with all the nipples.

I claim:

1. A toric packing to insure fluid tightness particularly for liquids under pressure, comprising an annular body portion, and a plurality of nipples located along a single row and widely spaced around the circumference of said body portion, alternate ones of said nipples projecting on opposite sides of a plane defined by said body portion, the base of said nipples being approximately equal to the width of the annular body portion.

2. A toric packing to insure fluid tightness particularly for liquids under pressure, comprising an annular body portion, and a plurality of nipples spaced around the circumference of said body portion and having a base whose width is approximately equal to the width of the annular body portion, alternate ones of said nipples projecting on opposite sides of a plane defined by said body portion, said nipples being four in number and being equally spaced around the circumference of said body portion.

3. A toric packing to insure fluid tightness particularly for liquids under pressure, comprising an annular body portion, and a plurality of nipples located along a single row and widely spaced around the circumference of said body portion, alternate ones of said nipples projecting on opposite sides of a plane defined by said body portion, each of said nipples having substantially the same height and having a base whose width is approximately equal to the width of said annular body portion.

4. A fluid tight joint structure comprising inner and outer relatively rotatable members, one of said members being provided with a circular groove, limited by two plane walls in a surface adjacent the other of said members, and a toric packing mounted within said groove, said toric packing including an annular body portion and a plurality of nipples spaced circumferentially around said body portion, said nipples being positioned to engage the sides of the groove, to deform said body portion into an undulating configuration.

5. A fluid tight joint structure comprising inner and outer relatively rotatable members, one of said members being provided with a groove in a surface adjacent the other of said members, and a toric packing of undulating configuration mounted within said groove, said toric packing including an annular body portion and a plurality of nipples spaced circumferentially around said body portion, adjacent ones of said nipples projecting on opposite sides of said body portion, each of said nipples being of substantially the same height, the height of said groove being substantially equal to the thickness of said body portion plus the height of one nipple.

6. A fluid tight joint structure comprising inner and outer relatively rotatable members, one of said members being provided with a groove in a surface adjacent the other of said members, and a toric packing of undulating configuration mounted within said groove, said toric packing including an annular body portion and a plurality of pairs of nipples spaced circumferentially around said body portion, one of the nipples of each pair being taller than the other, the taller nipples of adjacent pairs projecting from opposite sides of said body portion.

7. A fluid tight joint structure comprising inner and outer relatively rotatable members, one of said members being provided with a groove in a surface adjacent the other of said members, and a toric packing of undulating configuration mounted within said groove, said toric packing including an annular body portion, and a plurality of pairs of nipples spaced circumferentially around said body portion, one of the nipples of each pair being taller than the other, the taller nipples of adjacent pairs projecting from opposite sides of said body portion, the height of said groove being substantially equal to the thickness of said body portion plus the sum of the heights of one pair of nipples.

8. A toric packing comprising an annular body portion, and a plurality of pairs of nipples spaced circumferentially around said body portion, the nipples of each pair being of different heights and projecting on opposite sides of said body portion, the taller nipples of adjacent pairs being positioned on opposite sides of said body portion.

References Cited in the file of this patent

UNITED STATES PATENTS

| | | |
|---|---|---|
| 662,003 | Lamm | Mar. 20, 1900 |
| 2,247,609 | Devilbiss | July 1, 1941 |
| 2,571,500 | Trevaskis | Oct. 16, 1951 |
| 3,032,062 | Blahnik | May 1, 1962 |

FOREIGN PATENTS

| | | |
|---|---|---|
| 5,175 | Great Britain | Feb. 28, 1914 |
| 661,265 | Germany | Aug. 1, 1938 |
| 483,089 | Italy | July 15, 1953 |